United States Patent [19]

Kalfoglou

[11] 4,296,812

[45] Oct. 27, 1981

[54] SURFACANT WATERFLOODING OIL RECOVERY METHOD

[75] Inventor: George Kalfoglou, Houston, Tex.

[73] Assignee: Texaco Inc., White Plains, N.Y.

[21] Appl. No.: 106,212

[22] Filed: Dec. 21, 1979

Related U.S. Application Data

[63] Continuation-in-part of Ser. No. 46,132, Jun. 6, 1979, abandoned.

[51] Int. Cl.³ .............................................. E21B 43/22
[52] U.S. Cl. ................................... 166/274; 166/273; 166/275; 252/8.55 D
[58] Field of Search ................. 252/8.55 D; 166/274, 166/275, 273, 252

[56] References Cited

U.S. PATENT DOCUMENTS

| | | | |
|---|---|---|---|
| 3,827,497 | 8/1974 | Dycus et al. | 252/8.55 D X |
| 3,956,147 | 5/1976 | Christopher et al. | 252/8.55 D X |
| 4,018,278 | 4/1977 | Shupe | 166/274 X |
| 4,077,471 | 3/1978 | Shupe et al. | 252/8.55 D X |
| 4,143,716 | 3/1979 | Kalfoglou et al. | 166/274 |

*Primary Examiner*—Herbert B. Guynn
*Attorney, Agent, or Firm*—Carl G. Ries; Robert A. Kulason; Jack H. Park

[57] ABSTRACT

Disclosed is a novel surfactant fluid and an oil recovery method using the fluid for recovering oil from subterranean formations thereof by surfactant waterflooding process. The fluid comprises water and at least one surfactant, preferably including an alkylpolyalkoxyalkylene sulfonate or an alkylarylpolyalkoxyalkylene sulfonate and as an additive for reducing the rigidity of the interfacial film, a silica-polydialkylsiloxane such as a silica-polydimethylsiloxane. Reduction in rididity of the interfacial film occupied by surfactant molecules of which the hydrophobic portion is dissolved in the oil phase and the hydrophilic portion is dissolved in the aqueous phase, improves the effectiveness of the surfactant fluid for recovering oil from subterranean formations.

14 Claims, No Drawings

SURFACTANT WATERFLOODING OIL RECOVERY METHOD

CROSS REFERENCE TO RELATED APPLICATION

This is a continuation-in-part of copending application Ser. No. 46,132 filed June 6, 1979 for "Surfactant Waterflooding Oil Recovery Method", now abandoned.

FIELD OF THE INVENTION

This invention concerns a surfactant waterflood oil recovery method.

BACKGROUND OF THE INVENTION

Petroleum may be recovered from subterranean, petroleum-containing formations by penetrating the formation with one or more wells and pumping or permitting petroleum to flow to the surface through these wells, only if certain conditions exist in the formation. The petroleum must be present in an adequately high concentration in the formation, and there must be sufficient permeability or interconnected flow channels within the formation to permit the flow of fluids therethrough if sufficient pressure is applied to the fluid. When the formation has natural energy present in the form of an underlying active water drive, gas dissolved in the petroleum which can exert pressure to drive the petroleum to the producing well, or a high pressure gas cap above the petroleum-saturated formation, this natural energy is ordinarily utilized to recover petroleum in what is commonly referred to as primary recovery. When this natural energy source is depleted, or in the instance of those formations which do not contain sufficient natural energy within the formation to allow primary recovery, some form of supplemental recovery process or enhanced recovery process must be applied to the formation in order to extract additional petroleum therefrom. Supplemental recovery is sometimes referred to as secondary recovery or tertiary recovery, although in fact it may be primary, secondary or tertiary in sequence of employment.

The most commonly employed form of supplemental recovery is waterflooding, which comprises injecting water into the subterranean, petroleum-containing formation to displace petroleum toward a producing well from which it is recovered to the surface of the earth. While waterflooding is successful and economical, water does not displace petroleum efficiently, and therefore a substantial amount of petroleum remains in the formation after conclusion of waterflooding. This has been well recognized in the literature pertaining to oil recovery methods, and there are many prior art references suggesting incorporating surface active agents or surfactants in the flood water for the purpose of reducing the interfacial tension between the injected water and the formation petroleum, which accomplishes recovery of a greater portion of the residual oil after primary production than is possible with waterflooding.

Petroleum sulfonate and other organic sulfonates, as well as organic sulfates, have been proposed in many prior art references for surfactant waterflooding. While these materials are inexpensive and effective under ideal conditions, they are very sensitive to formation water salinity, and cannot be used alone in formations containing water whose salinity exceeds about 30,000 parts per million total dissolved solids. Alkylpolyethoxy sulfates and alkylarylpolyethoxy sulfates have also been proposed for surfactant waterflooding in other prior art references. While these materials are effective in high salinity environments, they are not stable at temperatures in excess of about 150° F. due to hydrolysis of the sulfate, and so their use is restricted to high salinity, low temperature formations.

U.S. Pat. Nos. 3,827,497; 3,890,239; and 3,977,471 describe surfactant waterflooding oil recovery processes using alkylpolyalkoxyalkylene sulfonates or alkylarylpolyalkoxyalkylene sulfonates, and recognize that these surfactants are stable at temperatures as high as 240° F. and tolerant of salinities as high as 220,000 parts per million total dissolved solids.

It is well recognized in the literature that surfactant flooding is effective in mobilizing oil as a result of the drastic reduction in interfacial tension between the oil phase and the aqueous surfactant solution. When an aqueous, surfactant-containing fluid contacts oil in a formation, interfaces are formed of interfacial films occupied by surfactant molecules of which the hydrophobic portion is dissolved in the oil phase and the hydrophilic portion is dissolved in the aqueous phase. The physical properties of the interfacial films play a role in oil mobilization during the course of surfactant waterflooding. If rigid interfacial films are formed, oil mobilization through porous media and banking of oil during surfactant flooding is greatly hindered. Interfacial film rigidity can be determined by measuring the relative film pressure of the crude oil/water interface. It is reported in the literature that crude oils from various reservoirs have different interfacial film pressures. Lowering the interfacial film rigidity of a surfactant system should increase the effectiveness of the surfactant fluid to mobilize oil and thereby should improve the overall tertiary oil recovery efficiency of surfactant flooding.

In view of the foregoing discussion, it can be appreciated that there is a substantial need for an additive for an aqueous surfactant fluid to be employed in surfactant waterflooding oil recovery processes, which effectively reduces the rigidity of the interfacial film, provided the cost of the additive is small compared to the improvement in oil recovery effectiveness resulting from employment thereof.

SUMMARY OF THE INVENTION

This invention concerns a surfactant waterflooding oil recovery process. The oil recovery process employs an aqueous fluid containing a surfactant or mixture of surfactants, the proper choice of which is largely dependent on the salinity of the water present in the formation in which the fluid is to be injected, and on the temperature of the formation, and also contains from 10 to 1000 and preferably from 50 to 500 parts per million of a silica-polydialkylsiloxane such as a silica-polydimethylsiloxane compound, which reduces the interfacial film rigidity, and thereby improves the amount of oil recovered from porous earth formations as a result of injecting the surfactant fluid into the formation.

DESCRIPTION OF THE PREFERRED EMBODIMENTS

This invention concerns a surfactant waterflooding oil recovery process employing an aqueous, surfactant fluid containing an effective amount of an additive which reduces the rigidity of the interfacial film.

The surfactant with which this additive in employed is determined largely by the salinity of the formation water and the temperature of the formation into which the fluid is to be injected. In low salinity water containing formation, e.g., those formations containing water whose salinity is less than 30,000 and preferably less than 20,000 parts per million total dissolved solids, the principle or even sole surfactant employed may be a petroleum sulfonate or other organic sulfonate such as a $C_7$ to $C_{25}$ and preferably a $C_9$ to $C_{22}$ alkyl sulfonate or a $C_5$ to $C_{25}$ and preferably a $C_8$ to $C_{16}$ alkyl-substituted benzene, toluene or xylene sulfonate. In the instance of using petroleum sulfonates, the preferred petroleum sulfonate is one comprising a mixture of organic sulfonates of varying equivalent weights of range from about 325 to about 500 and having a median equivalent weight in the range of 375 to 425.

Formations containing higher salinity water, e.g., in excess of 30,000 to 100,000 parts per million total dissolved solids which may include relatively high concentrations of divalent ions such as calcium and magnesium, require the use of synthetic surfactants having solubilities in the presence of high salinity brine fluids exceeding those of the simpler organic sulfonates discussed above. In low temperature formations, e.g., those formations having temperatures less than about 125° F., non-ionic sufactants such as ethoxylated alkanols or ethoxylated alkylphenols may be employed. These surfactants are frequently used as a solubilizer for petroleum sulfonates or other organic sulfonates, so one preferred embodiment of the present invention comprises a mixture of organic sulfonates such as petroleum sulfonates and a non-ionic surfactant. Particularly preferred non-ionic surfactants include $C_6$ to $C_{22}$ substituted phenols having from 5 to 20 moles of ethylene oxide per molecule.

Formations containing water whose salinities are in the range of from 80,000 to 150,000 parts per million total dissolved solids, the temperature of which is from 50° to 150° F. may be flooded with an aqueous fluid containing an ethoxylated and sulfated surfactant having the following formula:

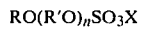

wherein R is a $C_6$ to $C_{25}$ and preferably $C_8$ to $C_{20}$ alkyl or an alkylaryl such as benzene, toluene or xylene having attached thereto a $C_5$ to $C_{22}$ and preferably a $C_7$ to $C_{18}$ alkyl group, R' is ethylene or a mixture of ethylene and higher molecular weight alkylene with relatively more ethylene than higher molecular weight alkylene, n is a number including fractional numbers from 1 to 20 and preferably from 2 to 15 and X is a monovalent cation such as ammonium, sodium, potassium or lithium. These ethoxylated and sulfated surfactants may be employed as substantially the only surfactant employed in the fluid, but they are preferably employed as a solubilizing co-surfactant in combination with an organic sulfonate, preferably the petroleum sulfonates discussed above. Accordingly, a preferred surfactant combination for use in high salinity, moderate temperature formations, is one containing from 0.5 to 10 percent petroleum sulfonate and from 0.2 to 8 percent by weight of one of the abovedescribed ethoxylated and sulfated surfactants.

In high temperature, high salinity formations, the especially preferred surfactant is an ethoxylated and sulfonated surfactant. In this embodiment the surfactant fluid contains at least one surfactant which is an alkylpolyalkoxyalkylene sulfonate or alkylarylpolyalkoxyalkylene sulfonate having the following formula:

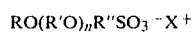

wherein R is an alkyl group, linear or branched, having from 6 to 24 and preferably 8 to 20 carbon atoms, or an alkylaryl such as benzene, toluene or xylene having attached thereto at least one linear or branched alkyl group having from 5 to 22 and preferably from 7 to 18 carbon atoms, R' is ethylene or a mixture of ethylene and higher alkylene such as propylene with relatively more ethylene than higher alkylene, n is a number from 1 to 20 and preferably from 2 to 15, R" is ethylene, propylene, hydroxypropylene, or butylene and $M^+$ is a monovalent cation such as ammonium or a monovalent metallic cation, preferably sodium, potassium or lithium. For example, a preferred surfactant within this group is sodium dodecyltetraethoxyethylene sulfonate in which R is an alkyl having 12 carbon atoms, R' is ethylene, n is 4, R" is ethylene, and $M^+$ is sodium.

The concentration of the ethoxylated and sulfonated surfactant is generally in the range of from about 0.05 to about 10 percent and preferably from 0.1 to 5.0 percent. The salinity of the surfactant fluid is generally from 60 to 120 percent of the salinity of the water present in the formation. The surfactant is tailored in a particular application by varying the values of R and n in the above formula, to ensure that the surfactant is slightly soluble in a fluid having a salinity about equal to the salinity of the water present in the formation, and accomplishes reduction in the interfacial tension between oil and water to a value less than $3 \times 10^{-2}$ dynes per centimeter, in order to ensure that it will perform as desired to accomplish low surface tension displacement of petroleum.

The above ethoxylated and sulfonated surfactant may be used as the only surfactant present in significant quantities in the fluid, in which case the concentration is from 0.5 to 10.0 and preferably from 1.0 to 5.0 percent by weight. In another preferred embodiment, it may be used in combination with an organic sulfonate, preferably petroleum sulfonates having a median equivalent weight in the range of from 350 to 450. Alkyl or alkylaryl sulfonates having from 8 to 24 carbon atoms in the alkyl chain are also suitable for use in my invention. When this embodiment is employed, the concentration of organic sulfonate is ordinarily from about 0.1 to about 10.0 and preferably from about 0.5 to about 6.0 percent by weight, while the concentration of the ethoxylated and sulfonated surfactant is from 0.5 to 5.0 and preferably from 1.0 to 4.0 percent.

The above-described surfactant fluid may also contain from 0.05 to 10.0 and preferably from 0.1 to 5.0 percent by weight of a low HLB water insoluble nonionic surfactant, specifically a polyethoxylated alkanol or alkylphenol, with a number of ethoxy units being selected so as to render the surfactant insoluble at the salinity of the formation water.

In addition to any of the above described surfactants, the use of which is described in the prior art, the surfactant fluid contains from 10 to 1000 and preferably from 50 to 500 parts per million of a silica-polydialkylsiloxane. The polydialkylsiloxane has the following structural formula:

HO(SiRR'O)$_n$H where R and R' are each an alkyl group, linear or branched, having from 1 to 6 and preferably 1 to 3 carbon atoms, and n is 1 to 2,000 and preferably from 100 to 1000. The polydialkylsiloxane is condensed with finely divided silica having particle size in the range of from 0.005 to 2.0 and preferably from 0.01 to 0.5 micron. The particle size of the compound tested was 0.1 micron. The upper range of particle size should be less than the average pore throat diameter of the formation being flooded. The silica-polydialkylsiloxane compound has high surface activity because it is composed of a hydrophilic and a hydrophobic portion.

An example of a commercially available silicapolydialkylsiloxane within this definition is DB-31 ® manufactured by Dow Corning Corporation and employed routinely as defoamers. This material is a silica polydimethylsiloxane, eg R and R' are each methyl, n is about 260, and the product contains about 10% silica whose particle size is 0.1 micron. DB-31 ® is sold and used commercially as a defoamer and functions as a defoamer by accumulating at the liquid-air interface, entering the surface layer, spreading and causing film rupture.

While the above disclosure pertains to the preferred method of incorporating the silica-polydialkylsiloxane in a surfactant waterflood oil recovery method by adding the material directly to the surfactant solution, the improvement in oil recovery effectiveness resulting from reduction in film rigidity can be achieved if the film modifier is incorporated in other fluids injected into the formation either before or after the surfactant fluid, or both, so as to accomplish mixing of the silica-polydialkylsiloxane with the surfactant fluid. The film rigidity-reducer may be injected into the formation in a preflush, immediately prior to injection of the surfactant fluid, so mixing between the surfactant fluid and the film rigidity reducer occurs in situ in the formation. Similarly, silicapolydialkylsiloxane may be incorporated in fluid injected into the formation immediately after the surfactant fluid, such as for example in at least the first part of a polymer-containing, viscous fluid injected into the formation after injecting the surfactant fluid, in order to accomplish mixing of the film rigidity reducer with the surfactant fluid. Optimum results are achieved if at least a portion of the fluid injected immediately before and immediately after the surfactant fluid contains the additive as well as the surfactant fluid itself. In any event, the concentration of silica-polydialkylsiloxane in the fluid injected before or after the surfactant fluid will be from 10 to 1,000 and preferably from 50 to 500 parts per million.

EXPERIMENTAL SECTION

The following describes the experimental work performed for the purpose of verifying the operability of the process of my invention, demonstrating the results obtained from employment thereof, and disclosing the preferred embodiments of the process of my invention.

Two core floods were employed, each utilizing a surfactant system followed by a polymer fluid, both fluids having been tailored to produce optimum results at the conditions of the tests. The second run was identical to the first, except for the fact that 100 parts per million DB-31 ®, the silica-polydimethylsiloxane sold by Dow Corning Corporation, was incorporated in the surfactant solution. In both runs, 0.32 pore volume of the surfactant fluid was injected first, both quantities of fluid containing 2.5 percent surfactant. The particular surfactants employed comprised 0.54 percent TRS 18, a predominantly oil soluble petroleum sulfonate produced by Witco Chemical Corp., and 1.22 percent TRS 40, a predominantly water soluble petroleum sulfonate also sold by Witco Chemical Corp. In addition, the surfactant fluid in each run contained 0.41 percent of nonylbenzenehexaethoxyethylene sulfonate as a solubilizer. In both runs the surfactant solution was prepared in an aqueous fluid containing 80,000 parts per million total dissolved solids. Both runs comprised following the surfactant fluid injection with 2 pore volumes of a fluid comprising 1000 parts per million Xanflood ® polymer prepared in fresh water for mobility control. Both floods were conducted at 109° F., and conditions in both runs were maintained identical except for the presence of 100 parts per million DB-31 ® in the second flood.

Run 1, the base run, recovered 59 percent of the tertiary oil. Run 2, the flood conducted employing the surfactant fluid containing 100 parts per million of the silica-polydimethylsiloxane, recovered 82.5 percent of the tertiary oil. It can be seen that incorporation of only 100 parts per million of the film rigidity-reducer in the surfactant fluid, recovered an additional 23.5 percent of the tertiary oil, a 40% improvement in the amount of oil recovered. This is a very encouraging result, and would improve the economics of an oil recovery method conducted under these conditions in the field by a significant amount, since the cost of this small concentration of silicipolydimethylsiloxane is much less than the value of the additional oil recovered.

The foregoing clearly illustrates how incorporation of a very small concentration of film rigidity reducer in either the surfactant fluid or other fluids injected into the formation before or after the surfactant fluid, greatly enhances the oil recovery effectiveness of the surfactant waterflood oil recovery method.

While my invention has been disclosed in terms of a number of illustrative embodiments, it is not so limited since many variations thereof will be apparent to persons skilled in the art of oil recovery without departing from the true spirit and scope of my invention. It is my desire and intention that my invention be limited and restricted only by those limitations and restrictions appearing in the claims appended immediately hereinafterbelow.

I claim:

1. In a method for recovering petroleum from a subterranean, permeable, petroleum-containing earth formation penetrated by at least one injection well and by at least one production well, by a surfactant waterflooding method comprising injecting an aqueous fluid containing from 0.5 to 10.0 percent of an alklypolyalkoxyalkylene sulfonate, an alkylarylpolyalkoxyalkylene sulfonate, or a mixture thereof, having the following formula:

$$R_aO(R_a'O)_{na}R_a''SO_3^-M^+$$

wherein $R_a$ is an alkyl group having from 6 to 24 carbon atoms, or an alkylaryl consisting of benzene, toluene or xylene having attached thereto at least one alkyl group containing from 5 to 22 carbon atoms, $R_a'$ is ethylene or a mixture of ethylene and higher molecular weight alkylene with relatively more ethylene than higher alkylene, $R_a''$ is ethylene, propylene, hydroxypropylene or butylene, $n_a$ is a number from 1 to 20, and M is sodium, potassium, lithium or ammonium, said fluid being injected into the formation via the injection well and displacing petroleum through the formation to the producing well where it is recovered to the surface of the earth, the improvement which for increasing the oil recovery effectiveness of the aqueous surfactant fluid comprises:

incorporating in the surfactant fluid, an effective amount in the range of from 10 to 1000 parts per million of silica-polydialkylsiloxane comprising silica having particle size in the range from 0.005 microns to 2.0 microns wherein the polydialkylsiloxane has the following formula:

$$HO(SiR_bR_b'O)_{nb}H$$

wherein $R_b$ and $R_b'$ are each a $C_1$ to $C_6$ alkyl, nb is a number from 1 to 2000, H is hydrogen, O is oxygen, and Si is silicon.

2. A method as recited in claim 1 wherein $R_b$ and $R_b'$ are each a $C_1$ to $C_3$ alkyl.

3. A method as recited in claim 1 wherein $n_b$ is a number from 100 to 1000.

4. A method as recited in claim 1 wherein $R_b$ and $R_b'$ are each methyl.

5. A method as recited in claim 1 wherein the particle size of silica is from 0.01 to 0.50 micron.

6. A method as recited in claim 1 wherein the concentration of silica-polydialkylsiloxane is from 50 to 500 parts per million.

7. A method as recited in claim 1 wherein the surfactant also contains from 0.10 to 10.0 percent of an organic sulfonate selected from the group consisting of petroleum sulfonate whose average equivalent weight is from 350 to 450, alkyl sulfonate having from 8 to 24 carbon atoms, alkylaryl sulfonates having from 8 to 24 carbon atoms in the alkyl chain, and mixtures thereof.

8. A method as recited in claim 1 wherein the surfactant also containing a low HLB, water insoluble nonionic surfactant.

9. A method as recited in claim 1 comprising the additional step of injecting into the formation, prior to injecting the surfactant fluid, an aqueous fluid comprising water having dissolved therein from 10 to 1000 parts per million of the silica-polydialkylsiloxane.

10. A method as recited in claim 1 comprising the additional step of injecting into the formation, subsequent to injecting the surfactant fluid, an aqueous fluid comprising water having dissolved therein from 10 to 1000 parts per million of silica-polydimethylsiloxane comprising silica having particle size in the range from 0.005 microns to 2.0 microns wherein the polydialkylsiloxane has the following formula:

$$HO(SiR_cR_c'O)_{nc}H$$

wherein $R_c$ and $R_c'$ are each a $C_1$ to $C_6$ alkyl, $n_c$ is a number from 1 to 1000, H is hydrogen, O is oxygen and Si is silicon.

11. In a method for recovering petroleum from a subterranean, permeable, petroleum-containing earth formation penetrated by at least one injection well and by at least one production well, by a surfactant waterflooding method comprising injecting an aqueous fluid containing from 0.05 to 10.0 percent by weight of an alkylpolyalkoxy sulfate or alkylarylpolyalkoxy sulfate having the following formula:

$$R_aO(R_a'O)_{na}SO_3X$$

wherein $R_a$ is a $C_6$ to $C_{25}$ alkyl or an alkylaryl consisting of benzene, toluene or xylene having attached thereto a $C_5$ to $C_{22}$ alkyl, O is oxygen, $R_a'$ is ethylene or a mixture of ethylene and higher alkylene with relatively more ethylene than higher alkylene, $n_a$ is a number from 1 to 20, and x is ammonium, sodium potassium or lithium, the improvement which for increasing the oil recovery effectiveness of the surfactant fluid comprises:

incorporating in the surfactant fluid, an effective amount in the range of from 10 to 1000 parts per million of silica-polydialkylsiloxane comprising silica having particle size in the range from 0.005 microns to 2.0 microns wherein the polydialkylsiloxane has the following formula:

$$HO(SiR_bR_b'O)_{nb}H$$

wherein $R_b$ and $R_b'$ are each a $C_1$ to $C_6$ alkyl, nb is a number from 1 to 2000, H is hydrogen, O is oxygen, and Si is silicon.

12. A method as recited in claim 11 wherein the fluid also contains from 0.10 to 10.0 percent by weight of an organic sulfonate selected from the group consisting of petroleum sulfonate with average equivalent weight in the range of 350 to 450, $C_8$ to $C_{24}$ alkyl sulfonate, alkylaryl sulfonate having from 8 to 24 carbon atoms in the alkyl chain, and mixtures thereof.

13. In a method of recovering petroleum from a subterranean, petroleum-containing earth formation penetrated by at least one injection well and at least one production well, comprising injecting an aqueous surfactant-containing fluid containing from 0.5 to 10.0 percent by weight of an alkylpolyalkoxyalkylene sulfonate, an alkylarylpolyalkoxyalkylene sulfonate, or a mixture thereof, having the following formula:

$$R_aO(R_2'O)_{na}R_a''SO_3-M+$$

wherein $R_a$ is an alkyl group having from 6 to 24 carbon atoms, or an alkylaryl consisting of benzene, toluene or xylene having attached thereto at least one alkyl group containing from 5 to 22 carbon atoms, $R_a'$ is ethylene or a mixture of ethylene and higher molecular weight alkylene with relatively more ethylene than higher alkylene, $R_a''$ is ethylene, propylene, hydroxypropylene or butylene, na is a number from 1 to 20, and M is sodium, potassium, lithium or ammonium, or an alkylpolyalkoxy sulfate, an alkylarylpolyalkoxy sulfate, or mixture thereof, having the following formula:

$$RO(R'O)_nSO_3-M+$$

wherein R,R',$n$ and M have the same meaning as $R_a$, $R_a'$, na and M, respectively, above said fluid being injected into the formation via the injection well, the surfactant-containing fluid displacing petroleum through the formation to the producting well from which it is recovered to the surface of the earth, the improvement which comprises:

injecting into the formation prior to the surfactant fluid, an aqueous fluid having dissolved therein from 10 to 1000 parts per million silica-polydialkylsiloxane, comprising silica having particle size in the range from 0.005 microns to 2.0 microns wherein the polydialkylsiloxane has the following formula:

$$HO(SiRR'O)_nH$$

wherein R and R' are each a $C_1$ to $C_6$ alkyl, n is a number from 1 to 2000, H is hydrogen, O is oxygen, and Si is silicon.

14. In a method of recovering petroleum from a subterranean, petroleum-containing earth formation penetrated by at least one production well and at least one injection well, comprising injecting an aqueous surfactant—containing fluid containing from 0.5 to 10.0 percent by weight of an alklypolyalkoxyalkylene sulfonate, an alkylarylpolyalkoxyalkylene sulfonate, or a mixture thereof, having the following formula:

$$R_aO(R_a'O)_{na}R_a''SO_3-M+$$

wherein $R_a$ is an alkyl group having from 6 to 24 carbon atoms, or an alkylaryl consisting of benzene, toluene or xylene having attached thereto at least one alkyl group containing from 5 to 22 carbon atoms, $R_a'$ is ethylene or a mixture of ethylene and higher molecular weight alkylene with relatively more ethylene than higher alkylene, $R_a''$ is ethylene, propylene, hydroxypropylene or butylene, na is a number from 1 to 20, and M is sodium, potassium, lithium or ammonium, or an alkylpolyalkoxy sulfate, an alkylarylpolyalkoxy sulfate, or mixture thereof, having the following formula:

$$RO(R'O)_nSO_3-M+$$

wherein $R,R',n$ and M have the same meaning as $R_a$, $R_a'$, na and M, respectively, above said fluid being injected into the formation via the injection well, the surfactant-containing fluid displacing petroleum through the formation to the producing well from which it is recovered to the surface of the earth, the improvement which comprises:

injecting into the formation subsequent to the surfactant fluid, an aqueous fluid having dissolved therein from 10 to 1000 parts per million silica-polydialkylsiloxane, comprising silica having particle size in the range from 0.005 microns to 2.0 microns wherein the polydialkylsiloxane has the following formula:

$$HO(SiRR'O)_nH$$

wherein R and R' are each a $C_1$ to $C_6$ alkyl, n is a number from 1 to 2000, H is hydrogen, O is oxygen, and Si is silicon.

* * * * *